(12) United States Patent
Cooper

(10) Patent No.: US 10,059,437 B2
(45) Date of Patent: Aug. 28, 2018

(54) MULTI-ROTOR SAFETY SHIELD

(71) Applicant: Robert Stanley Cooper, Apopka, FL (US)

(72) Inventor: Robert Stanley Cooper, Apopka, FL (US)

(*) Notice: Subject to any disclaimer, the term of this patent is extended or adjusted under 35 U.S.C. 154(b) by 239 days.

(21) Appl. No.: 14/991,141

(22) Filed: Jan. 8, 2016

(65) Prior Publication Data

US 2016/0200415 A1 Jul. 14, 2016

Related U.S. Application Data

(60) Provisional application No. 62/101,201, filed on Jan. 8, 2015.

(51) Int. Cl.
| | |
|---|---|
| *B64C 27/20* | (2006.01) |
| *B64C 39/02* | (2006.01) |
| *B64C 39/00* | (2006.01) |
| *A63H 27/00* | (2006.01) |
| *B64C 1/06* | (2006.01) |

(52) U.S. Cl.
CPC ............. *B64C 27/20* (2013.01); *A63H 27/12* (2013.01); *B64C 39/001* (2013.01); *B64C 39/024* (2013.01); *B64C 1/062* (2013.01); *B64C 2201/027* (2013.01); *B64C 2201/108* (2013.01)

(58) Field of Classification Search
CPC . B64C 27/20; B64C 39/001; B64C 2201/027; B64C 2201/108; B64C 2201/162; A63H 27/12
See application file for complete search history.

(56) References Cited

U.S. PATENT DOCUMENTS

| | | | |
|---|---|---|---|
| 339,355 | A | 4/1886 | Van Wormer |
| 4,795,111 | A | 1/1989 | Moller |
| 5,575,438 | A | 11/1996 | McGonigle et al. |
| 6,153,959 | A | 11/2000 | Lorenzo |
| 6,270,038 | B1 | 8/2001 | Cycon et al. |
| 7,032,861 | B2 | 4/2006 | Sanders, Jr. et al. |
| 7,249,732 | B2 | 7/2007 | Sanders, Jr. et al. |
| 7,712,701 | B1 | 5/2010 | Ehrmantraut et al. |

(Continued)

*Primary Examiner* — Nicholas McFall
(74) *Attorney, Agent, or Firm* — Rimon, P.C.; Letao Qin

(57) ABSTRACT

The Multi-Rotor Safety Shield (MRSS) provides a complete and substantial encasement system which can be secured about a Drone, protecting a multitude of aircraft components from contact with any outside disturbance and which can protect the sensitive components from dust, water, wind, rain, snow, fingers, toes, appendages of any kind, and atmospheric changes as example, from disabling the Drone and can protect people, places or things from high velocity spinning exposed rotor/propellers. The MRSS provides rigid non-permeable platform for attaching or incorporating additional safety devices as found in the Drone industry (or other industries) resulting in a safety device that completely prevents the loss a Drone due to the catastrophic failure of any Drone system or combination of systems which would typically result in rapid decent, and/or uncontrolled flight. The MRSS makes Drones safe near humans and safe to use around public gatherings, stadium events, accident scenes, disaster search and rescue and disaster relief, and indoors for the security and communications markets among others expanding the availability of Drones to further assist humanity.

1 Claim, 3 Drawing Sheets

(56) References Cited

U.S. PATENT DOCUMENTS

| | | |
|---|---|---|
| 8,328,130 B2 | 12/2012 | Goosen |
| 8,774,982 B2 | 7/2014 | Oakley et al. |
| 8,777,157 B2 | 7/2014 | Barrett et al. |
| 9,004,973 B2 | 4/2015 | Condon et al. |
| 9,650,134 B2 | 5/2017 | Chappell |
| 2016/0229530 A1* | 8/2016 | Welsh .................. B64C 39/024 |
| 2016/0257394 A1* | 9/2016 | Gleason ................ B29C 70/882 |

* cited by examiner

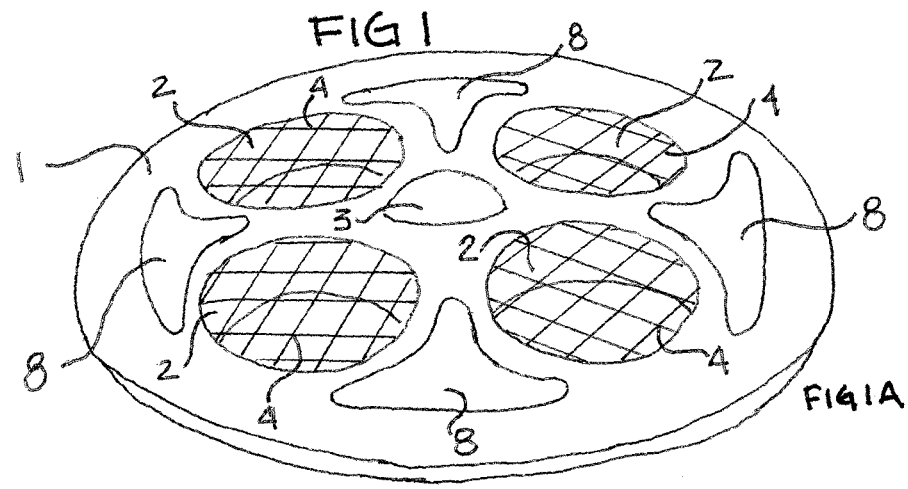
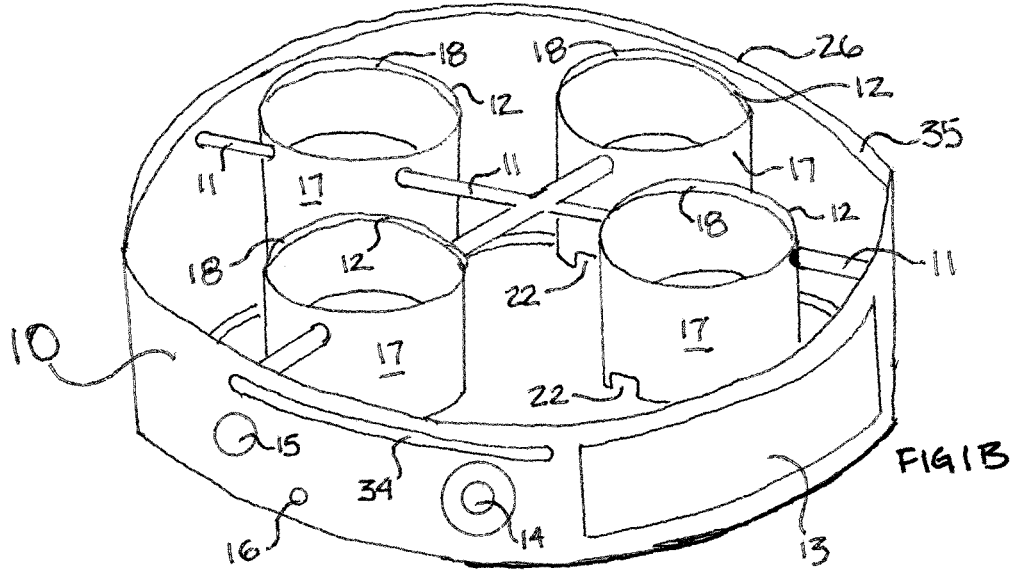
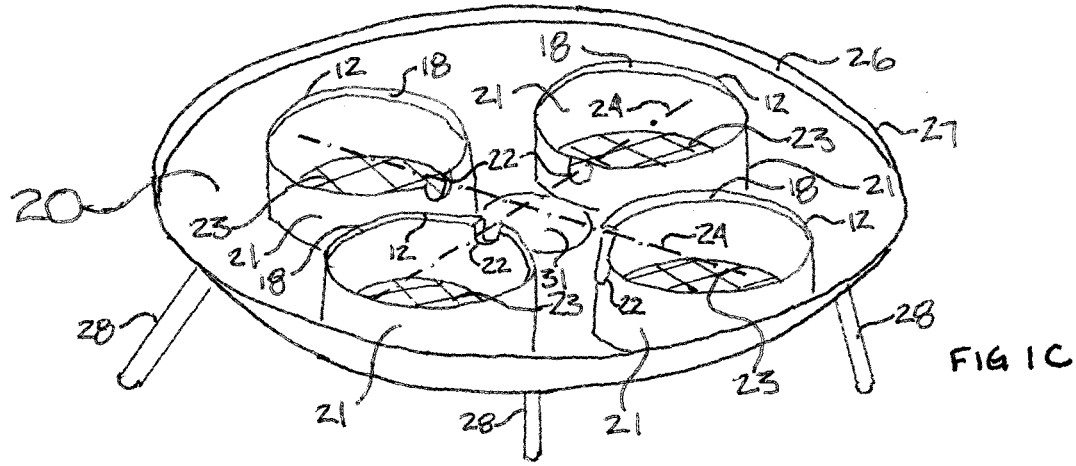

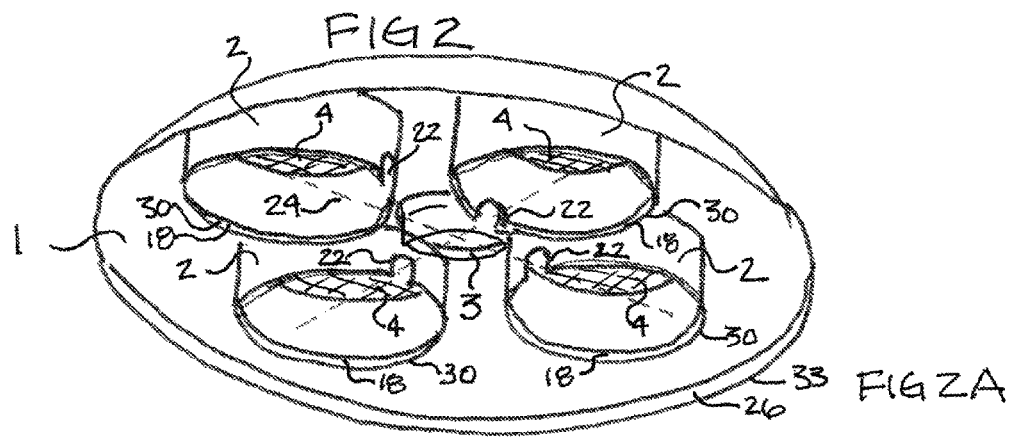
FIG 2
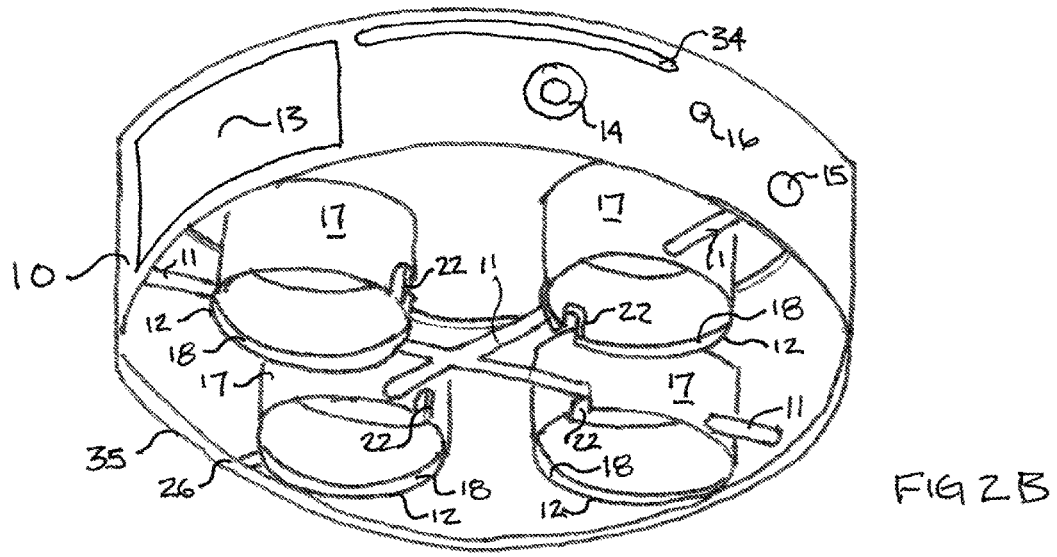
FIG 2A
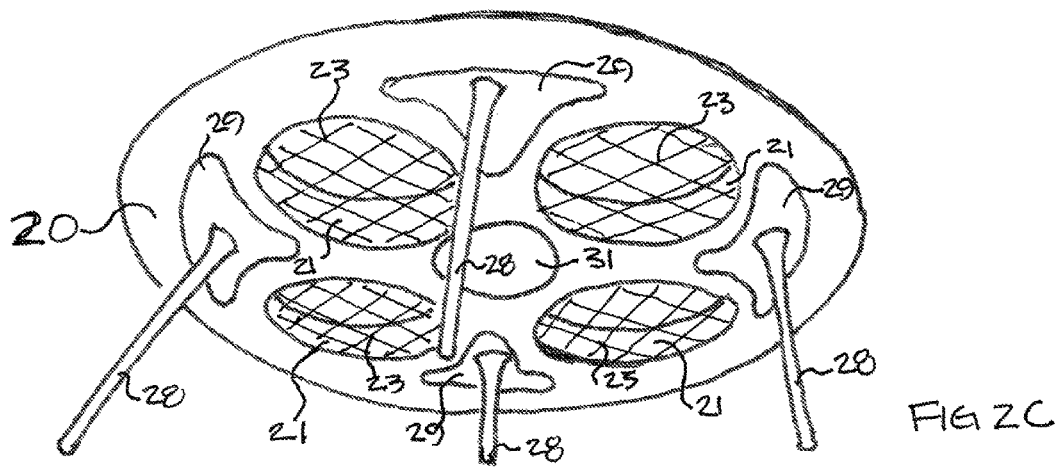
FIG 2B
FIG 2C

FIG 3
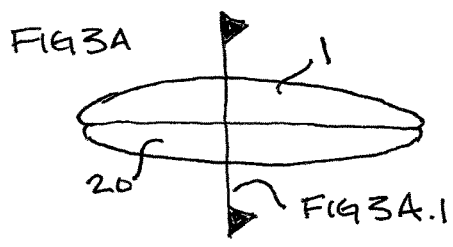
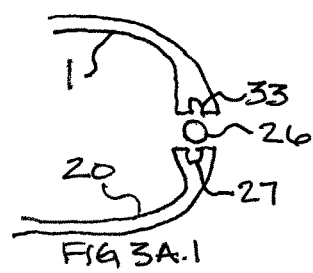
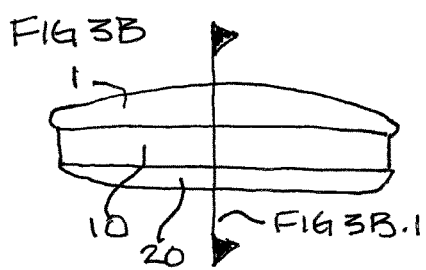
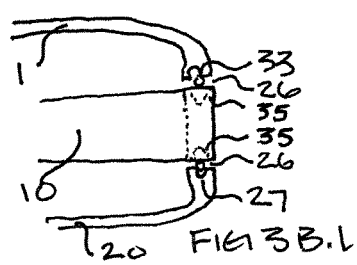
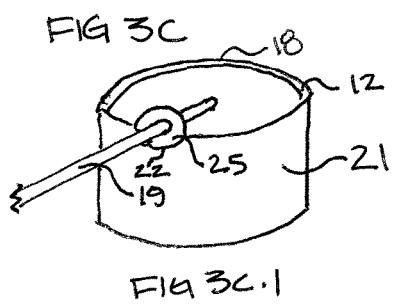
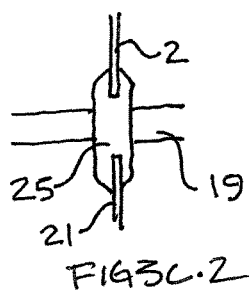
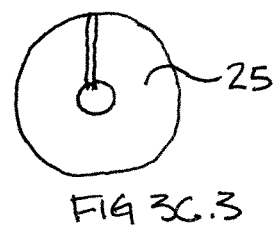

MULTI-ROTOR SAFETY SHIELD

CROSS-REFERENCE OF RELATED APPLICATIONS

This application claims the benefit of provisional patent application Ser. No. 62/101,201 filed 2015 Jan. 8, by Jason Terry Daniel Attorney for the claimant.

FEDERALLY SPONSORED RESEARCH

None.

SEQUENCE LISTING

None

BACKGROUND

Prior Art

The following is a tabulation of some prior art that presently appears relevant:

| U.S. Patents | | | |
|---|---|---|---|
| Pat. No. | Kind Code | Issue Date | Patentee |
| 4,795,111 | | 1989 Jan. 3 | Moller |
| 5,575,438 | | 1996 Nov. 19 | McGonigle et al. |
| 6,153,959 | | 2000 Nov. 28 | Lorenzo |
| 6,270,038 | B1 | 2001 Aug. 7 | Cycon et al. |
| 7,032,861 | B2 | 2006 Apr. 25 | Sanders, Jr. et al. |
| 7,249,732 | B2 | 2007 Jun. 31 | Sanders, Jr. et al. |
| 7,712,701 | B1 | 2010 May 11 | Ehrmantraut et al. |
| 8,328,130 | B2 | 2012 Dec. 11 | Goosen |
| 8,774,982 | B2 | 2014 Jul. 8 | Oakley et al. |
| 8,777,157 | B2 | 2014 Jul. 15 | Barrett et al. |
| 2014/0339355 | A1 | 2014 Nov. 20 | OLM et al. |
| 9,004,973 | B2 | 2015 Apr. 14 | Condon et al. |

| International Patent Documents | | | |
|---|---|---|---|
| Patent Number | Kind Code | Issue Date | Patentee |
| WO2015/105554 | A1 | 2015 Jul. 16 | Santangelo et al. |

BACKGROUND OF THE INVENTION

Owing to recent advances in technology, there has been a dramatic surge in the development and popularity of unmanned aerial vehicles (UAV), commonly referred to as Vertical Take Off and Landing vehicle (VTOL), Unmanned Aerial Systems (UAS), small Unmanned Aerial Systems (sUAS) or simply drones (hereinafter referred to as Drone or Drones,) in the military, commercial and hobbyist sectors. The current discussion does not imply any size or weight restrictions for the Drones, but does focus on the small-scale, portable Drone and not the airplane size Drone used in military applications. With particular respect to Multi-Rotor Drones that are capable of vertical takeoff and landing, such devices are finding useful employment with, but not limited to, real estate, agriculture, medical transport, movies and television, merchandise delivery, entertainment, sports marketing and branding, infrastructure maintenance, surveillance operations (such as border patrol) military reconnaissance, and disaster reconnaissance among many others.

In this regard, commercial Drone flights are set to become a widespread reality in the United States, owing to a law passed by Congress called FAA Modernization and Reform Act of 2012. As such, Drone flights by law enforcement agencies and the military, which already occur on a limited basis, are projected to surge, along with widespread implementation by commercial endeavors. The Senate Transportation Committee Subcommittee on Aviation held a hearing Dec. 10, 2014, titled *U.S. Unmanned Aircraft Systems: Integration, Oversight and Competitiveness*. At these ongoing hearings Chairman Frank LoBiondo (R-NJ) Subcommittee on Aviation stated "There are many issues surrounding UAS we need to consider. The first and foremost is safety. Safety is the cornerstone of the U.S. Aviation industry, and without it, the UAS industry cannot succeed, period." Transportation and Infrastructure Committee Chairman Bill Shuster (R-PA) additionally stated, "I share Mr. LoBiondo's views on safety. Safety in our skies is simply paramount. That has to be the first and foremost to us. So we in Congress are very interested in UAS. The UAS industry cannot develop unless it is proven safe. Republicans and Democrats are united in our views about the priority and importance of safety."

Drones are comprised of any size modular airframe to which any number of rotors (electric engines) are attached. A singular Rotor drives a singular propeller and when this assembly is used in multiples as example 3, 4, 6, 8, 10, 12 or any multiple, these rotor/propellers combine as the mechanism for lifting the modular airframe into flight. Drones have any variety of electronic systems for GPS, navigation or wireless communications. Drones are energized by any number of modalities including but not limited to batteries, a combustion engine, jet propulsion or any other means. Drones can include the capability to carry a payload (including but not limited to a camera, packages for delivery, and armaments as example) and are used as a platform for attaching any number of other sensors to capture and record the environment such as infra-red, ultrasonic and many others. Drones typically have a landing gear system either retractable or stationary.

Although Drones can be built from lightweight material such as Styrofoam and powered by low speed electrical rotors, modern drones are increasingly built from heavier composite materials, and include complex and high performance power plants which can spin the propellers at velocities between 10,000 and 50,000 RPM's, as an example. Many hobbyist, commercial or industrial Drones come from the manufacturer with plastic propellers. When these Drones come in contact with people or property they can cause damage (minimal) to either people or property. Some Drones (but not all) have a software program that shuts down all rotors when resistance to the propellers rotation is discovered. The software shuts down all working rotors which in turn causes rapid descent and/or uncontrolled flying. The most popular and highest selling Drone for hobbyist, commercial or industrial use does not utilize software to shut down the propellers, but uses stock plastic propellers as a measure to make the Drone somewhat safe. To solve performance and durability issues caused by the plastic propellers the current market offers an upgrade for a minimal investment (about 0.05% of the initial investment cost of the Drone or $25.00) to a carbon fiber blade. Unprotected a carbon fiber blades spinning at 40,000 rpm become a dangerous razor sharp cutting instrument that can lacerate human flesh and can cause disastrous or even fatal damage to humans and/or cause disastrous property damage.

The market currently offers propeller protectors for some hobbyist models. Many are designed to detach if they encounter a foreign object. These propeller protectors offer vertical propeller tip protection but still leave the exposed propeller to contact people, places or things from a multitude of other angles including inside, above, below, etc.

Many resources are being poured into developing newer and better drones which can perform for longer periods of time, and carry greater payloads. The industry estimates that $89 billion will be invested globally into Drones over the next 10 years, and many U.S. Companies have already begun investing in Drone technology. The FAA recently projected that in December of 2015 more than 1,000,000 new Drones would be introduced in FAA airspace as a result of amateur demand, Christmas purchases and expanding commercial acceptance. As a result the FAA launched a massive safety campaign including education and compulsory registration for all Drones primarily aimed at Drones under 55 pounds. Amazon PrimeAir, Walmart, Google and UPS, as example, have been in development for a package delivery system to deliver packages to any location via Drones. The HorseFly Octocopter (currently in testing), as developed by AMP Electric and in conjunction with the University of Cincinnati Research Institute appears to be using 8 rotors with 10" carbon fiber blades to deliver packages to business and residences. It would only be logical in the commercial extension of the drone market that commercial techniques appropriate to historical aircraft construction be used for durability and better reliability. Wood, Carbon Fiber, Aluminum or metal propellers are the next logical step to this end. Once wood, carbon-fiber, aluminum, or steel or any other metal is employed for commercial or hobbyist use, the danger from the propellers becomes immediate.

At the 22nd annual American Society for Mechanical Engineers (ASME) Student Design Competition held in November 2014 and as reported in the ASME website sighting the event stated "The University of North Dakota team took first place with their massive 78.4 lbs. steel-and-aluminum machine," thereby indicating their possible use of aluminum propellers. This is a further indicator that aluminum or metal propellers will be the future for commercial ventures in Drone technology to address long term maintenance and reliability issues.

Unfortunately, one of the less talked about aspects of drone flight involves malfunctions. Drones have malfunctioned in a myriad of ways, have become disoriented by lack of communication and have ultimately been lost to the user plummeting from the sky because of multitude of reasons including but not limited to propeller contact, mechanical breakdowns, human error, bad weather, electronic failures, and lost communications. When the catastrophic failure of any system causes uncontrolled descent or erratic flight Drones possess a substantial threat to people, places or things.

In current literature and patent filings we find examples of rings, shrouds, ducts or magnets, as example, that claim to transfer or confine the airstream, and/or focus air and are part of a system to create thrust and/or lift from the rotors/propellers, but make no claim of protecting the propellers or any component of Drone or drone systems, and thus are incomplete as a safety system.

U.S. Pat. No. 4,795,111 Moller states a claim of a flying platform using at least one ducted fan comprising power means, a horizontally mounted propeller having blades and connected to and driven by said power means for causing a vertically downwardly directed airstream and a cylindrical duct having an out rim extending around and beneath said propeller for confining said airstream. FIG. 9 100 of Moller's patent shows a plurality of ducts and has art similar to the Multi-Rotor Safety Shield (herein after referred to as MRSS) but makes no claim of safety from such placement of the ducts or platform. While their air manifold is similar it is not embodied in a complete exterior protection system and does not include any screen or vent to cover the ducting and/or has not claim of protection for the mechanical, electrical or physical components that comprise a Drone. U.S. Pat. No. 7,249,732 Sanders, Jr. et al. uses an air vane assembly to control and modify (Drone) movement, has a surrounding impeller motor frame that stops vertical contact with the propellers and uses blades fixed to a annular impeller disk driven by magnetic induction elements arrayed in an air channel duct, but again makes no claims of any kind that this system provides any safety or protection from outside disturbances nor provides any claim or method for protecting the Drone or hover aircraft from any disturbance that may cause catastrophic in flight failure and/or rapid descent.

U.S. Pat. No. 8,328,130 Gossen, U.S. Pat. No. 8,774,982 Oakley et al., and U.S. Pat. No. 5,575,438 McGonigle et al., all indicate a structure, ring, duct or channel that surrounds the propeller and state vertical tip protection as an adjunct to the technology patented, but none make any claim to provide complete and substantial Drone propeller encasement. They state that by default they have vertical impact resistance as a result of the placement of the rings, ducts, or channels. U.S. Pat. No. 7,032,861 Sanders et al., goes a step further and actually states the use of an air vane assembly to control lateral linear motion of the vehicle, and that the hollow annular duct or shroud structure around a center air flow channel for the rotor isolates the rotor for "safety" and also serves as a noise abatement shield, but makes no specific claim that this shroud structure protects the Drone from vertical impact as the shroud is part of the impeller electronic rotor mechanism.

U.S. Pat. No. 8,328,130 Goossen claims use of light weight material and a ducted fan assemblies, but makes no claim of the ducted fan being used for any reason except to direct air flow. U.S. Pat. No. 8,777,157 Barrett et al. claims stability of the hovering platform though a constrained layer damping system, but makes no claims that the duct system constitutes a safety system for rotor or propeller. U.S. Pat. No. 5,575,438 uses a toroidal plastic ring that surrounds the entire Drone and makes the claim of having vertical impact resistance, but makes no claim for horizontal impact resistance thereby making no claim for complete and substantial encasement of the Drone nor does it imply protection from rapid descent or erratic flying.

International Publication Number WO 2015/10554 A1 Giuesppe Santangelo and Skypersonic LLC describes a protective enclosure assembly that is a variety of shapes and is a permeable flexible enclosure. In one embodiment the enclosure is a sphere that can protect the vehicle assembly from bumps, collision and other similar occurrences and enables the operation of ground mode or rolling mode in addition to flying mode. WO 2015/10554 A1 Giuesppe Santangelo and Skypersonic LLC states the enclosure component (spherical device, as example) can protect the vehicle assembly (Drone) from being damaged by the environment of the apparatus and the enclosure component (spherical device) can also protect the persons and property in the environment of the apparatus from being damaged by the vehicle assembly (Drone). Additionally by speaking of the enclosure component as permeable with large gaps around a variety of shapes, that make up the apparatus, this allows for a wide variety of foreign objects to come in contact with the Drone assemblies electrical and mechanical components as example, dust, water, wind, rain, snow, fingers, toes, and appendages, as an example. To describe the air flow required for the movement function of the apparatus WO 2015/10554 A1 Giuesppe Santangelo and Skypersonic LLC states "An area in the surface of the enclosure assembly 120 that is air permeable . . . . In some embodiments, the openings 136 are simply spaces between members 130 or other totally vacant space in the surface of the enclosure assembly." The enclosure members that comprise the exterior enclosure are also described in this statement: "The air flow required for the movement function generated by propellers 162 is provided by one or more openings 136 in the enclosure assembly 120." WO 2015/10554 A1 goes on to say under III. INTRODUCTION OF ELEMENTS section 2. Enclosure of Assembly Components sub section b. Opening, "An area in the surface of the enclosure assembly 120 that is air permeable. Openings 136 can be shaped in a wide variety of different geometries and configurations. In some embodiments, the openings 136 are simply spaces between members 130 or other totally vacant space in the surface of the enclosure assembly 120."

While WO 2015/10554 A1 Giuesppe Santangelo and Skypersonic LLC purports enclosure, it cannot support nor state complete and substantial encasement due to the exposure of the critical Drone components. Furthermore it makes no claim of providing a platform for any type of safety mechanisms as example a parachute or inflatable floating bladder that can protect the Drone, people, places or things from catastrophic in flight failure, sudden or rapid descent or erratic flight.

SUMMARY

The Multi-Rotor Safety Shield (MRSS) is a complete and substantial encasement system which can be secured about a Drone, protecting a multitude of aircraft components from contact with any outside disturbance and which can protect the sensitive components from dust, water, wind, rain, snow, fingers, toes, appendages of any kind, as example, from disabling the Drone and can protect people, places or things from high velocity spinning exposed rotor/propellers. The MRSS provides a rigid non-permeable platform for attaching or incorporating additional safety devices as found in the Drone industry (or other industries) such as parachutes, air bags, Radio-frequency Identification Devices (RFID), a FAA "N" number, a universal gimbal mounting plate and any number of accessories, know or unknown to the industry at this time. The MRSS fitted with a parachute, an inflatable air bag and an RFID chip results in a safety device that provides unparalleled safety and complete and substantial protection from the highly likely and much reported situation of losing a Drone due to the catastrophic failure of any Drone system or combination of systems which would typically result in rapid decent, and/or uncontrolled flight.

The MRSS provides further benefit to the industry by making Drones safe near humans and safe to use around public gatherings, stadium events, accident scenes, disaster search and rescue and disaster relief, and indoors for the security and communications markets among others, expanding the availability of Drones to further assist humanity. The MRSS is capable of being utilized with a plurality of different types of Drones. One embodiment of the MRSS is adapting to portable Drones that are non-military and is not intended for the airplane size military drones, though no size, weight or industry usage restriction is implied or suggested.

DRAWINGS—FIGURES

In the drawings, closely related figures have the same number but different alphabetic suffixes.

FIG. 1 shows the top housing component for the MRSS in a top view exploded perspective in accordance with one embodiment.

FIG. 1A shows the top housing component for the MRSS in a top view perspective in accordance with one embodiment.

FIG. 1B shows the middle housing component for the MRSS in a top view perspective in accordance with one embodiment.

FIG. 1C shows the bottom housing component for the MRSS in a top view perspective in accordance with one embodiment.

FIG. 2 shows the top housing component for the MRSS in a bottom exploded perspective in accordance with one embodiment.

FIG. 2A shows the top housing component for the MRSS in a bottom view in accordance with one embodiment.

FIG. 2B shows the middle housing component for the MRSS in a bottom view in accordance with one embodiment.

FIG. 2C shows the bottom housing component for the MRSS in a bottom view in accordance with one embodiment.

FIG. 3 shows various aspects of the MRSS in a sectional detail.

FIG. 3A shows a top view of the MRSS.

FIG. 3A.1 shows various aspects of the MRSS in a sectional detail for the top housing circumferential groove, bottom housing circumferential groove and circumferential gasket.

FIG. 3B shows a side view of the MRSS.

FIG. 3B.1 shows various aspects of the MRSS in a sectional detail for the top housing circumferential groove, middle housing circumferential groove, bottom housing circumferential groove and circumferential gasket.

FIG. 3C shows an exploded view of the MRSS.

FIG. 3C.1 shows various aspects of the MRSS in a detail showing an exploded view of the manifold/crossbar junction.

FIG. 3C.2 shows various aspects of the MRSS in a side view detail showing the manifold/crossbar grommet.

FIG. 3C.3 shows various aspects of the MRSS in a top view detail showing the manifold/crossbar grommet.

DRAWINGS - REFERENCE NUMERALS

| | |
|---|---|
| 1 Top housing component | 2 Intake manifold |
| 3 Parachute and parachute bay | 4 Manifold screen |
| 8 Accessory bays | 10 Middle housing component |
| 11 Middle housing to manifold attachment | 12 Manifold groove |
| 13 Visual media presentation screen LED | 14 Speaker |
| 15 Auxiliary camera | 16 Microphone |
| 17 Pass through manifold | 18 Manifold gasket |
| 19 Drone crossbar | 20 Bottom housing component |
| 21 Exhaust manifold | 22 Manifold/crossbar opening |
| 23 Manifold screen | 24 Drone |

-continued

| DRAWINGS - REFERENCE NUMERALS | |
|---|---|
| 25 Exhaust manifold/crossbar grommet | 26 Housing component circumferential gasket |
| 27 Bottom housing component gasket groove | 28 Landing gear |
| 29 Inflatable device | 30 Intake manifold groove |
| 31 Universal gimbal adaptor | 33 Top housing component gasket groove |
| 34 Illumination device/light | 35 Middle housing component gasket groove |

Several illustrations containing one embodiment of the Multi-Rotor Safety Shield are provided as drawings. It should be appreciated, however, that the invention is not limited to the precise arrangements and instrumentalities shown. The MRSS is described below with respect to the figures. As will be known to those of skill in the art, the below descriptions and illustrations are to provide but one means for performing the inventive concepts and are not to be limiting in any way as to system components or method steps.

DETAILED DESCRIPTION—FIRST EMBODIMENT

As shown, one embodiment (FIGS. 1A, 1B and 1C) of the MRSS includes a plurality of housings, capable of surrounding a Drone. For example, the housings (not limited to the number discussed) include an upper housing 1, a middle plurality of modular demountable housings 10 and a lower housing 20, capable of enclosing a Drone, and prevents the Drone's rotors/propellers from accidental contact with people, places or things thereby avoiding damage and/or catastrophic failure to either. The complete and substantial safety encasement system includes a plurality of flexible water and air resistant gaskets, grommets, plugs, seals, or sealers 18, 25, and 26 as example made of rubber, silicone, acrylic or any other elastic material in a grooved, cut, slatted, or machined indentation, as example, 12, 27, 30, 33, and 34 between where any two housing components come together and/or meet and in conjunction with the manifold/crossbar pass through grommets 25 between the intake 2 and exhaust 21 manifolds, and protects the interior mechanical, electrical or physical components of the Drone from dust, water, wind, rain, snow, atmospheric occurrences or any other disturbance that could disable the Drone systems and cause catastrophic in flight failure. The MRSS is a water and impact resistant shell or bumper that provides an additional aspect of safety from contact with unknown or unseen objects. The complete and substantial safety encasement system includes intake 2 and exhaust 21 manifolds that are covered with any foil of screen cover 4 or any form of air permeable grid that prevents the failure of the rotors/propellers as a result of contact with any outside disturbance and prevents any outside disturbance from coming in contact with the rotor/propellers. The plurality of modular demountable housings possibilities for the MRSS can include, but is not limited to, various mountable forms of fall protection by automatically deploying parachutes 3, and/or inflatable bladders 28, airbags, foam, inner tube or any other deflective devices that can create large air filled pockets surrounding a disabled Drone, if it is determined that the Drones is in freefall, or in uncontrolled flight.

In addition to protecting Drones, drone components, people, places and things, the MRSS functions as a platform for a plurality of modular demountable components which enhance the performance and/or utility of the Drones to which it is secured. In this regard, the plurality of modular demountable housings comprise any number of technology solutions such as lights 34, cameras 15, landing gear 28, microphones 16, sensors, tracking devices, Wi-Fi hot spots, and flight data crash analysis recorders, among many others as examples.

By providing safety aspects, never before available, the MRSS allows for expanded use of Drones beyond the current FAA restrictions. Some current FAA restrictions, as they apply to the Drones in an outdoor environment, require the Drone to be away from crowds or people, within line of sight, and maintain an altitude no higher than 400 feet. Because of the advanced safety and anti-failure measures of the MRSS it will now be possible to expand the use of Drones into close proximity of humans, gathering of humans, stadium gatherings or indoors as example there by providing a much larger industry application for use of Drones than the current unshielded Drone. In addition as Drone usage expands to interior applications it is most certain that the Authority Having Jurisdiction (AHJ, possibly OSHA) will require complete and substantial encasement as a certain measure to insure safety in said environments.

The embodiments described herein are not meant to be an exhaustive presentation of the ways in which the various features of the invention may be formed or combined. Accordingly, the embodiments are not mutually exclusive of combinations of features; rather the invention may comprise a combination of different individual features selected from different individual embodiments, as understood by persons of ordinary skill in the art.

Operation—First Embodiment

Now that a basic understanding of the intent and principals of the Multi-Rotor Safety Shield (MRSS) have been described, the following detailed disclosure is provided. As will be known to those of skill in the art, however, the invention is not to be construed as limiting to the following description, as many other shapes, sizes, construction materials and uses are also contemplated.

In one embodiment the MRSS is a modular system with two primary components 1, 20 and a plurality of modular demountable components 10. The composition of the MRSS is of any variety of thermoformed or machineable plastic including but not limited to ABS, Acetyl, Acrylic, HDPE, PVC, UHMW or PTFE. Composition of the MRSS can also be any variety of metal including but not limited to aluminum, steel, stainless steel, copper, brass, bronze, or lightweight metals and or any future materials that become available.

In one embodiment the bottom housing component 20 is any shape or configuration that provides the bottom component for the complete and substantial water resistant and non-permeable encasement system and provides the Drone, people, places and things with protection in the event of any catastrophic systemic failure of electrical or mechanical systems. It protects the rotor/propeller from impact by providing the housing for an exhaust manifold 21 (consistent with the number of rotors) and provides for attachment to any type of screen or grid 23 covering the exterior portion of the manifold further preventing, any contact with the rotor/propeller. In one embodiment the bottom housing component 20 is attached to an existing drone with 3, 4, 6, 8 or 10 or any plurality of attachment points with a crossbar manifold pass through attachment grommet 25 which can attach directly onto to any or all of the crossbars of the airframe. The MRSS employs any number a plurality of flexible water and air resistant gaskets, grommets, plugs, seals, or sealers 18, 25, and 26 as example made of rubber, silicone, acrylic or any other elastic material in a grooved, cut, slat, machined indentation, as example, 12, 27, 30, 33, and 34 and also between where any two housing components come together or meet and with the manifold/crossbar pass through grommets 25 located between where the intake 2 and exhaust 21 manifolds junction with the Drone crossbars 24. The bottom housing component can mount plurality of inflatable devices 29 that will deploy if the Drones is in freefall, or uncontrolled flight. The mountable inflatable device is intended to secure a safe landing, be buoyant (in case of a water landing) and is deployed to protect the public and the Drone from a sudden and catastrophic decent even if a parachute 3 has been deployed.

In one embodiment the top housing component 1 is any shape or configuration that provides the top component for the complete and substantial water resistant and non-permeable safety encasement system and provides the Drone, people, places or things with protection in the event of any catastrophic systemic failure of electrical or mechanical systems and protects the rotor/propeller from impact by providing the housing for an intake manifold 2 (consistent with the number of rotors) and provides for attachment to any type of screen or grid 4 covering the exterior portion of the manifold further preventing any contact with the propeller or rotor. In one embodiment the top housing component is attached to a plurality of modular demountable housings and/or the bottom housing 20 by a variety of clamps, snaps, clasps, screws, glue, tape, or tie wrap devices, as example, or any other method of connecting the two housings. The top housing shares the use of a plurality of flexible water and air resistant gaskets 26 in a grooved indentation S between where any two housing components are fastened together. In one embodiment the top housing component 1 is removable and not permanently attached to the plurality of modular demountable housings or to the bottom housing component 20 allowing access to the rotors, electronics, camera systems, recording devices, amplifiers, speakers, microphones or any other payload. It attaches to the top 1 and bottom housings 20 by a variety of clamps, snaps, clasps, screws, glue, tape, or tie wrap devices, as example, or any other method of connecting the two housings together. The top housing component 1 has any number of mountable parachute devices 3 that will deploy if the Drone is in freefall, or uncontrolled flight, including but not limited to, communications failure, weather changes, electrical and or mechanical malfunctions and any other malfunctions including human error. The mountable parachute device 3 is intended to secure a safe landing in case the Drone is lost due to communications failure and is deployed to protect the public and the Drone from a sudden and catastrophic decent even if the bottom housing mountable component inflatable device 29 has been deployed.

The plurality of modular demountable middle housing components 10, is of any height with straight or curved sides, and is an insert between the bottom housing 20 and the top housing 1. This middle plurality of multiple modular housings 10 have pass through manifolds 17 (consistent with the number of rotors and the number of modules) and is attached to the bottom housing 20 and the top housing component 1 by any variety of clamps, snaps, clasps, screws, glue, tape, or tie wrap devices, as example, or any other method of connecting the housings.

The middle housing shares a plurality of flexible water and air resistant gaskets 26 in a grooved indentation 35 between where any two housing components are fastened together which includes a complete circumferential flexible barrier around the exterior of the MRSS and a complete circumferential water and air resistant flexible barrier around the pass thru manifold 17. In one embodiment the middle housing component 10 is demountable and is not permanently attached to the top housing component 1 or the bottom housing component 20. The middle housing component 10 is defined as an Advertising, News Reporting and or Disaster two way communication system accessory to the MRSS, but is not limited to this purpose as it may have future unknown uses. At the exterior vertical surface of a plurality of modular demountable housing components 10 are a plurality of mountable visual media presentation strips that comprise a flexible LED strip 13 or any other medium for relaying visual image presentation that comprises any variety of heights filling the space between the top housing component 1 and the bottom housing component 20 and can be continuous around the entire middle housing 10. In one embodiment this middle plurality of modular demountable housings 10 comprises but is not limited to a plurality of cameras, multiple speakers, multiple short range and long range microphones and is powered by battery or a small combustion engine or any other propulsion devices previously stated.

The middle plurality of modular demountable housing components 10 is a communication device intended to provide visual advertising, and to allow broadcasting of audio and video including but not limited to live voice, music or broadcast of video images and can include accessories such as lighting by LED strip lighting or any other lighting/illumination component available now or in the future. The middle plurality of modular demountable housing components 10 also allows for audio recording and real time transmission of audio recording by any means to a recording medium. The middle plurality of modular demountable housing component 10 can include a recording device to mimic a Flight Data Recorder and that records audio, video, GPS, navigation, thus adding to the overall safety aspects of the MRSS by recording all components of the Drones actions in the event of any failure of any system causing communications loss, freefall, or uncontrolled flight.

CONCLUSION, RAMIFICATIONS AND SCOPE

Thus the reader will see that in at least one embodiment of the Multi-Rotor Safety Shield (MRSS) comprises a complete and substantial modular safety encasement system that protects people, places and things from being damaged by high velocity rotor/propellers and protects the Drone from catastrophic damage by people, places or things. The MRSS protects all sensitive electronic and mechanical equipment and a multitude of rotor/propellers from malfunctioning. The MRSS provides a rigid non-permeable encasement system about the Drone which includes a physical barrier to outside disturbances and includes water and air resistant barriers. The reader will also see that by implementing a complete and substantial modular safety encasement system to surround Drones they can be adapted to a wider variety of uses including but not limited to indoor and outdoor stadium events, crime and disaster scenes and can be completely safe to fly indoors around people, places and things further expanding the use of Drones for humanity. The essence of the MRSS is to provide a never before used safety device to attach to a Drone that makes any plurality of Drones the safest machines in the world.

As to a further description of the manner and use of the present invention, the same should be apparent to those skilled in the arts from the above description. Accordingly, no further discussion relating to the manner of usage and operation will be provided. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The invention claimed is:

1. A Multi: Rotor Safety Shield that comprises a complete and substantial safety encasement system for a Vertical Take Off and Landing (VTOL) aircraft, a small Unmanned Aerial System (sUAS), or an Unmanned Aerial Vehicle (UAV), said encasement system comprising:

a top housing platform and a bottom housing platform, wherein said housing platforms allow for a plurality of middle demountable modular sections between said top housing and bottom housing platforms; wherein said top housing and bottom housing platforms are attached to a multiplicity of VTOL, sUAS or UAV frame crossbars by a plurality of clamps, snaps, clasps, screws, glue, tape or tie wraps; wherein said middle demountable modular sections are demountable; wherein said top and bottom housing platforms are attached to multiple middle demountable modular sections by a plurality of clamps, snaps, clasps, screws, glue, tape or tie wraps; and wherein said top housing platform and bottom housing platform are configured to accommodate mountable devices; and manifold shafts that provide a channel of unencumbered airflow around rotors and propellers; wherein said manifold shafts provide structural reinforcement of said housing platforms and middle demountable modular sections; and wherein said manifold shafts have an air permeable membrane, mesh or grill at the exterior opening of said manifold shafts;

wherein said encasement system is made of one or more sheets of non-permeable material; wherein said housing platforms and middle demountable modular sections are sealed by flexible plastic, rubber, silicone gaskets or any other sealant, which is seated in a grooved, cut, slated, or machined indentation between where any two of said housing platforms and said middle modular sections meet, and forms a non-permeable air, water and dust barrier between where any top housing platform, bottom housing platform and the plurality of middle demountable modular sections meet.

* * * * *